No. 759,757. PATENTED MAY 10, 1904.
R. D. SCOTT.
DIFFERENTIAL GEAR FOR POWER DRIVEN VEHICLES.
APPLICATION FILED JULY 20, 1903.
NO MODEL.

WITNESSES
A. N. D. Emery.
A. K. Hood.

INVENTOR
Rufus D. Scott
By his Atty.
Henry Williams

No. 759,757. Patented May 10, 1904.

UNITED STATES PATENT OFFICE.

RUFUS D. SCOTT, OF BEVERLY, MASSACHUSETTS, ASSIGNOR TO ALBERT G. ROPES, OF MORRISTOWN, NEW JERSEY.

DIFFERENTIAL GEAR FOR POWER-DRIVEN VEHICLES.

SPECIFICATION forming part of Letters Patent No. 759,757, dated May 10, 1904.

Application filed July 20, 1903. Serial No. 166,277. (No model.)

*To all whom it may concern:*

Be it known that I, RUFUS D. SCOTT, a citizen of the United States, residing in Beverly, in the county of Essex and State of Massachusetts, have invented a new and useful Improvement in Differential Gears for Power-Driven Vehicles, of which the following is a specification.

This is an improved differential gear adapted to be applied to either the driving-shaft or the intermediate shaft of vehicles driven by explosive-engines or other power; and it has for its object to enable either wheel on the driving-shaft to operate as the driving-wheel while the other is running idly, as when traveling in a curved line, or both to become drivers, or neither, by reason of an exceedingly simple, strong, efficient, and easily-operated mechanism.

The nature of the invention is fully described below and illustrated in the accompanying drawings, in which—

Figure 1:
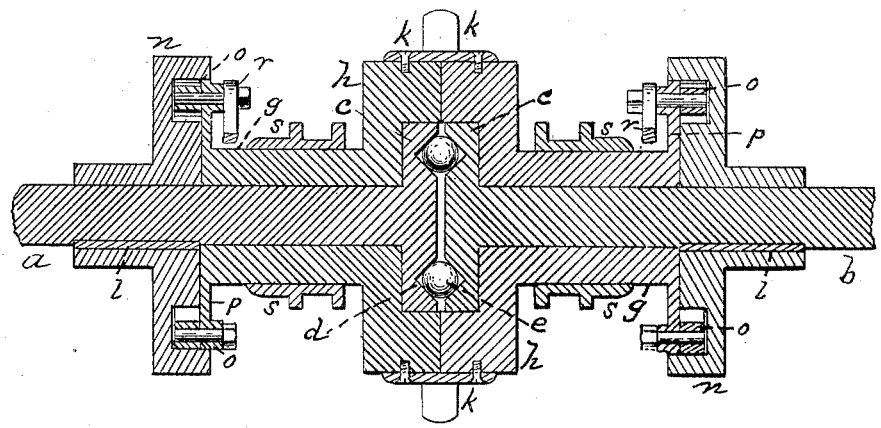
Figure 2:
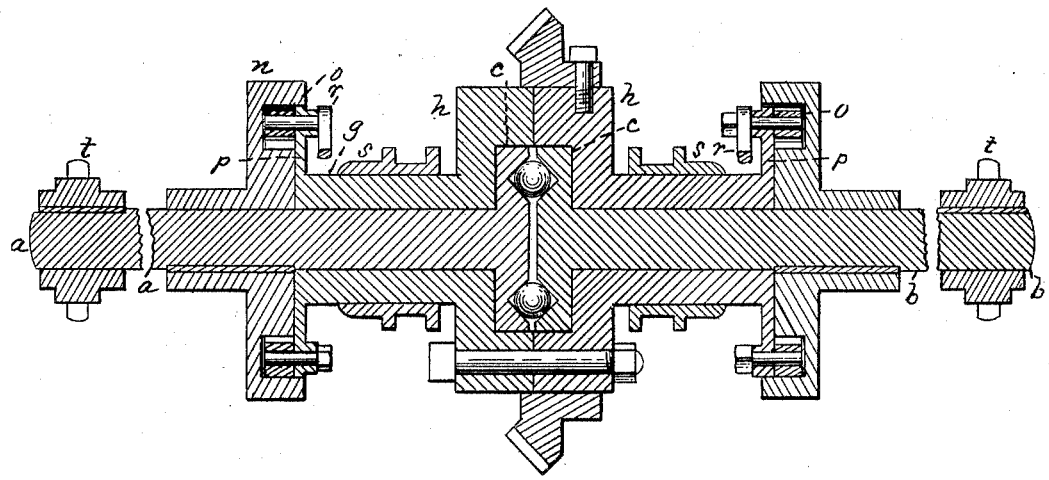

Figure 1 is a longitudinal section taken through the mechanism applied to the rear or driving shaft. Fig. 2 is a similar view with the mechanism applied to the intermediate shaft.

Referring to Fig. 1, $a$ and $b$ represent the two portions of a divided rear or driving shaft of an automobile, the adjacent ends being formed up into plates or disks $c$ $c$, which are provided with coincident grooves $d$ for the accommodation of antifriction-balls $e$. Each portion $a$ $b$ of the shaft is provided with a sleeve $g$, the inner ends $h$ of the sleeves being formed into a box or case to inclose the parts $c$, and said ends $h$ are provided with and secured together by a sprocket-wheel $k$, which is connected with the power. Keyed at $l$ to the two portions $a$ and $b$ of the divided shaft are the disks $n$, which, together with the disks or flanges $p$ integral with the sleeves $g$, constitute the two members of friction-clutches. These clutches are of any well-known and suitable construction and are preferably operated by spreading mechanisms $o$, which are moved into engagement by spreading levers $r$, actuated by cones $s$. The clutches, spreading mechanism, and cones are not new and require no detailed description, their purpose and operation being to transmit rotative movement from the sleeves $g$ to the portions $a$ $b$ of the shafts and thence to the rear or driving wheels, which are located upon the outer ends of said portions.

In Fig. 1 the clutches are represented as out of engagement, and consequently, although the sprocket-wheel $k$ and sleeves $g$ are rotating, there is no rotation necessarily transmitted to either of the parts $a$ $b$ of the driving-shaft. If the automobile is being driven in a straight line, the members of both clutches are moved by the operator into engagement by the cones $s$, and both portions $a$ $b$ of the divided driving-shaft are rotated equally. Should it be desired to drive the vehicle on a curved line or to apply the power to one driving-wheel, as in the case of certain roughnesses or inequalities of the surface of the road, the members of the clutch on one side—that is, the outside in going around a curve or the side which is encountering the greatest obstruction—are moved into engagement, so that the driving-wheel on that portion of the divided shaft is driven by the shaft, while the other wheel is idle and simply moving over the road by the friction of the road-bed.

In Fig. 2 exactly the same construction is illustrated and similarly lettered, as in Fig. 1; but the divided shaft is the intermediate shaft instead of the rear or driving shaft, and the outer end of each portion of the divided shaft is connected by a sprocket-wheel $t$ and a suitable chain with the rear or driving wheels. In both cases the operation is exactly the same, power being applied at will to either, both, or neither of the driving-wheels.

Having thus fully described my invention, what I claim, and desire to secure by Letters Patent, is—

In a differential gear, the divided shaft consisting of the two portions $a$ $b$ formed at their adjacent ends into plates or disks $c$; the sleeves $g$ surrounding said portions $a$ $b$ and formed at their adjacent ends into the two parts $h$ of a box which incloses said plates, and provided at their outer ends with clutch members; clutch members adapted to rotate with the two portions of the divided shaft; mechanism for moving the clutch members on the sleeves into engagement with those on the shafts; and mechanism for rigidly connecting the box portions *h* of the sleeves, whereby motion may be imparted to each shaft independent of the other or to both simultaneously, for the purpose set forth.

In testimony whereof I have signed my name to this specification in the presence of two subscribing witnesses.

RUFUS D. SCOTT.

Witnesses:
BENJAMIN B. MURRAY,
EDWARD ELDRED.